United States Patent
Matsumoto et al.

(10) Patent No.: US 10,014,118 B2
(45) Date of Patent: Jul. 3, 2018

(54) ELECTROLYTIC CAPACITOR

(71) Applicant: Panasonic Intellectual Property Management Co., Ltd., Osaka (JP)

(72) Inventors: Takayuki Matsumoto, Yamaguchi (JP); Yoshiaki Ishimaru, Yamaguchi (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/261,706

(22) Filed: Sep. 9, 2016

(65) Prior Publication Data
US 2016/0379759 A1 Dec. 29, 2016

Related U.S. Application Data

(63) Continuation of application No. PCT/JP2015/001469, filed on Mar. 17, 2015.

(30) Foreign Application Priority Data

Mar. 27, 2014 (JP) ................. 2014-065832

(51) Int. Cl.
*H01G 9/048* (2006.01)
*H01G 9/028* (2006.01)
(Continued)

(52) U.S. Cl.
CPC ............ *H01G 9/048* (2013.01); *H01G 9/025* (2013.01); *H01G 9/028* (2013.01); *H01G 9/035* (2013.01); *H01G 9/0036* (2013.01)

(58) Field of Classification Search
CPC ........ H01G 9/048; H01G 9/025; H01G 9/028; H01G 9/035; H01G 9/0036
See application file for complete search history.

(56) References Cited

U.S. PATENT DOCUMENTS

2008/0002334 A1* 1/2008 Kakuma ............... H01G 9/022
361/511
2008/0201926 A1* 8/2008 Tateishi ............... H01G 9/0036
29/25.03

(Continued)

FOREIGN PATENT DOCUMENTS

CN 101345138 A 1/2009
JP 2003-100559 4/2003
(Continued)

OTHER PUBLICATIONS

International Search Report of PCT application No. PCT/JP2015/001469 dated Jun. 16, 2015.
(Continued)

*Primary Examiner* — Dion R Ferguson
(74) *Attorney, Agent, or Firm* — McDermott Will & Emery LLP

(57) ABSTRACT

An electrolytic capacitor includes a capacitor element. The capacitor element includes a winding body, a solid electrolyte layer containing a conductive polymer, and an electrolytic solution. The winding body is configured to be wound around by an anode member on which a dielectric layer is formed, and a cathode member. The solid electrolyte layer is formed in the winding body. An electrolytic solution is impregnated into the winding body in which the solid electrolyte layer is formed. A volume ratio of the electrolytic solution impregnated into the winding body to the solid electrolyte layer formed in the winding body ranges from 1.27 to 2.54 both inclusive.

4 Claims, 2 Drawing Sheets

(51) Int. Cl.
*H01G 9/035* (2006.01)
*H01G 9/025* (2006.01)
*H01G 9/00* (2006.01)

(56) References Cited

U.S. PATENT DOCUMENTS

| | | | |
|---|---|---|---|
| 2009/0021893 A1 | 1/2009 | Kakuma et al. | |
| 2011/0019339 A1* | 1/2011 | Merker | H01G 9/025 361/523 |
| 2011/0128675 A1* | 6/2011 | Merker | H01G 9/0036 361/523 |
| 2016/0099113 A1* | 4/2016 | Komatsu | H01G 9/025 361/525 |
| 2016/0336117 A1* | 11/2016 | Koseki | H01G 9/0036 |

FOREIGN PATENT DOCUMENTS

| | | |
|---|---|---|
| JP | 2008-010657 | 1/2008 |
| JP | 2008-034257 | 2/2008 |
| JP | 2009-016770 | 1/2009 |
| JP | 2011-151410 | 8/2011 |

OTHER PUBLICATIONS

English Translation of Chinese Search Report dated Jan. 30, 2018 for the related Chinese Patent Application No. 201580016505.X.

* cited by examiner

US 10,014,118 B2

ELECTROLYTIC CAPACITOR

RELATED APPLICATIONS

This application is a Continuation of International Application No. PCT/JP2015/001469, filed on Mar. 17, 2015, which in turn claims priority from Japanese Patent Application No. 2014-065832, filed on Mar. 27, 2014, the contents of all of which are incorporated herein by reference in their entireties.

BACKGROUND

1. Technical Field

The present disclosure relates to an electrolytic capacitor, particularly to an electrolytic capacitor having a capacitor element that includes both a solid electrolyte and an electrolytic solution.

2. Description of the Related Art

In recent years, along with high performance of electronic devices, a capacitor having high capacitance and small equivalent series resistance (ESR) is required as a capacitor mounted on an electronic device. As such a capacitor, a winding-type solid electrolytic capacitor is used in many cases. A capacitor element included in this winding-type solid electrolytic capacitor has a winding body wound around by a cathode foil and an anode foil on which a dielectric layer is formed. In a winding body is formed a solid electrolyte layer containing a conductive polymer.

Conventionally, for forming a solid electrolyte layer in a winding body, an electrolytic polymerization method, a chemical polymerization method, and the like have been used. Specifically, a winding body is immersed in a polymerization solution for forming a conductive polymer to infiltrate the polymerization solution into a gap present in the winding body. Subsequently, monomers in the polymerization solution are polymerized to generate a conductive polymer in the winding body. However, the method for forming a solid electrolyte layer by using the polymerization solution makes the manufacturing process of a solid electrolytic capacitor complicated.

In such circumstances, as a method for forming a solid electrolyte layer in a winding body, the following processes are proposed (for example, see Unexamined Japanese Patent Publication No. 2008-10657). First, a winding body is impregnated with a dispersion liquid in which particles of a conductive polymer are dispersed or a solution in which a conductive polymer is dissolved, to infiltrate the dispersion liquid or the solution into a gap present in the winding body. Then, drying is conducted to dry the dispersion liquid or the solution impregnated into the winding body. By these processes, a solid electrolyte layer is formed in the winding body.

Further, as to the electrolytic capacitor prepared according to the method for forming a solid electrolyte layer by using the dispersion liquid or the solution, it is proposed that the winding body be impregnated with an electrolytic solution in addition to the formation of the solid electrolyte layer, in order to improve the characteristics of the electrolytic capacitor (for example, see Unexamined Japanese Patent Publication No. 2008-10657).

SUMMARY

An electrolytic capacitor according to the present disclosure includes a capacitor element. The capacitor element includes a winding body, a solid electrolyte layer containing a conductive polymer, and an electrolytic solution. The winding body is wound around by an anode member on a surface of which a dielectric layer is formed, and a cathode member. The solid electrolyte layer is formed in the winding body. An electrolytic solution is impregnated into the winding body in which the solid electrolyte layer is formed. A volume ratio of the electrolytic solution impregnated into the winding body to the solid electrolyte layer formed in the winding body ranges from 1.27 to 2.54 both inclusive. The electrolytic solution is not limited to a solution containing an electrolyte but also includes a non-aqueous solvent containing no electrolyte.

In a preferable specific configuration of the electrolytic capacitor, the capacitor element includes a void in which neither the solid electrolyte layer nor the electrolytic solution is present. A volume ratio of the void to a maximum volume of the electrolytic solution that can be impregnated into the winding body before the solid electrolyte layer is formed ranges from 0.04 to 0.38 both inclusive.

In the electrolytic capacitor described above, the solid electrolyte layer is formed by impregnating the winding body with a dispersion liquid in which particles of a conductive polymer are dispersed or a solution in which a conductive polymer is dissolved, and then drying the dispersion liquid or the solution impregnated into the winding body.

DETAILED DESCRIPTION OF EMBODIMENT

Prior to describing exemplary embodiments of the present disclosure, problems in the conventional technique are briefly described. As to the electrolytic capacitor having the capacitor element that includes both the solid electrolyte and the electrolytic solution, the characteristics of the electrolytic capacitor have not been optimized.

The present disclosure provides a technique capable of optimizing the characteristics of the electrolytic capacitor having the capacitor element that includes both the solid electrolyte and the electrolytic solution.

[1] Configuration of Electrolytic Capacitor

Figure 1:
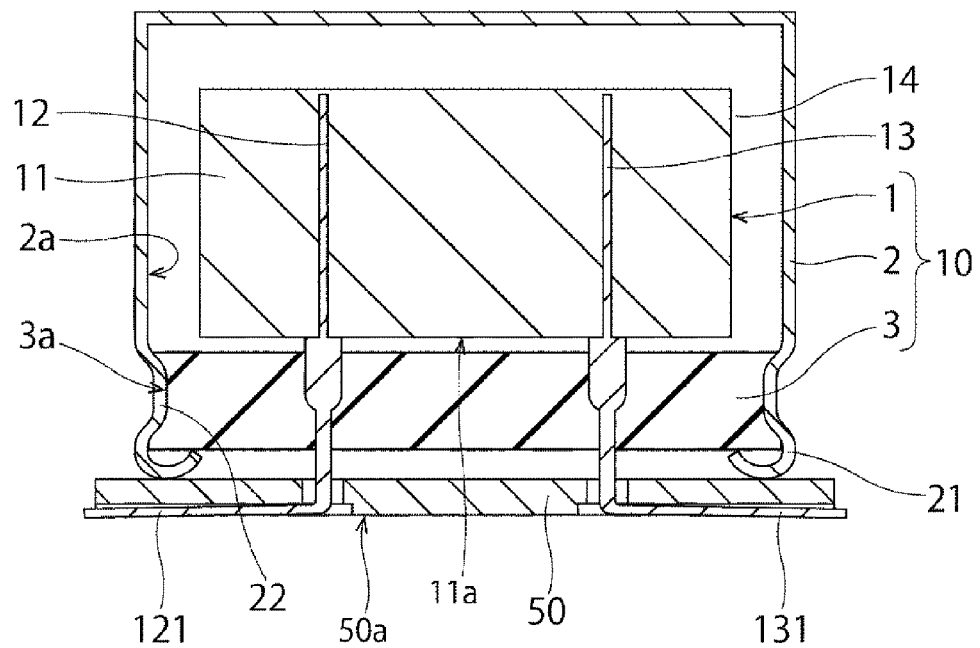
FIG. 1 is a schematic sectional view of an electrolytic capacitor according to an exemplary embodiment of the present disclosure.

FIG. 1 is a schematic sectional view of an electrolytic capacitor according to an exemplary embodiment of the present disclosure. As shown in FIG. 1, the electrolytic capacitor includes capacitor main body 10 and base plate 50 on which capacitor main body 10 is mounted. Capacitor main body 10 includes capacitor element 1, bottomed cylindrical outer case 2 in which capacitor element 1 is housed, and sealing member 3 fitted in opening 21 of outer case 2.

Capacitor element 1 includes winding body 11, anode lead tab terminal 12, and cathode lead tab terminal 13. Winding body 11 is configured to be wound around by a laminate of an anode foil on a surface of which a dielectric layer is formed, a cathode foil, and a separator. Here, the anode foil and the cathode foil are each formed of a valve metal such as aluminum, tantalum, and niobium. The separator is stacked between the anode foil and the cathode foil so as to be interposed between the anode foil and the cathode foil in winding body 11. Winding body 11 may be configured to be wound around by an anode member and a cathode member that are not limited to the foil but also have various forms.

Between the anode foil and the cathode foil is formed a solid electrolyte layer containing a conductive polymer. The solid electrolyte layer is formed by impregnating winding body 11 with a dispersion liquid in which particles of a conductive polymer are dispersed, and then drying the dispersion liquid impregnated into winding body 11. The solid electrolyte layer may be formed by impregnating winding body 11 with a solution in which a conductive polymer is dissolved, and then drying the solution impregnated into winding body 11.

The conductive polymer preferably has high conductivity. Examples of such a conductive polymer include polypyrrole, polythiophene, polyaniline, polyfuran, and a derivative of these polymers. Among these polymers, a derivative of polythiophene, i.e. polyethylenedioxythiophene (PEDOT) has a high self-repairing function in addition to high conductivity, and therefore is particularly preferred as the conductive polymer. In the solid electrolyte layer may be contained at least one conductive polymer selected from various conductive polymers not limited to these conductive polymers. The conductive polymer preferably contains a dopant. As the dopant, for example, p-toluenesulfonic acid and polystyrene sulfonic acid can be used.

Further, winding body 11 is impregnated with an electrolytic solution, and the electrolytic solution fills a gap present inside winding body 11 and is in contact with the dielectric layer and the solid electrolyte layer. The electrolytic solution used for the electrolytic capacitor of the present exemplary embodiment is not limited to a solution containing an electrolyte but also includes a non-aqueous solvent containing no electrolyte. It is preferred, however, that the non-aqueous solvent used as the electrolytic solution be one that can exhibit a repairing action for repairing a damaged part of the dielectric layer, and that does not deteriorate a conductive polymer that has contacted with the non-aqueous solvent. Examples of such a non-aqueous solvent include γ-butyrolactone (boiling point 204° C.), sulfolane (boiling point 285° C.), ethylene glycol (boiling point 197.3° C.), and propylene carbonate (boiling point 240° C.). The non-aqueous solvent is not limited to these solvents but may include at least one solvent selected from various solvents that can exhibit a repairing action.

Here, a volume ratio R1 of the electrolytic solution impregnated into winding body 11 to the solid electrolyte layer formed in winding body 11 preferably ranges from 1.27 to 2.54 both inclusive. Particularly preferably, the volume ratio R1 ranges from 2.12 to 2.54 both inclusive. Capacitor element 1 includes in winding body 11 a void in which neither the solid electrolyte layer nor the electrolytic solution is present. A volume ratio R2 of the void to a maximum volume of the electrolytic solution that can be impregnated into winding body 11 before the solid electrolyte layer is formed preferably ranges from 0.04 to 0.38 both inclusive.

The volume ratios R1 and R2 can be represented by the following formulae (1) and (2), respectively, by using a volume ratio Rp of the solid electrolyte layer formed in winding body 11 to the maximum volume of the electrolytic solution that can be impregnated into winding body 11 before the solid electrolyte layer is formed, and a volume ratio Re of the electrolytic solution impregnated into winding body 11 to the maximum volume of the electrolytic solution that can be impregnated into winding body 11 before the solid electrolyte layer is formed.

$$R1 = Re/Rp \quad (1)$$

$$R2 = 1 - Rp - Re \quad (2)$$

Anode lead tab terminal 12 is electrically connected to the anode foil, and cathode lead tab terminal 13 is electrically connected to the cathode foil. Anode lead tab terminal 12 and cathode lead tab terminal 13 are drawn out from winding end surface 11a of winding body 11. Anode lead tab terminal 12 connected to the anode foil is not limited to a case of one anode lead tab terminal, but may be a case of a plurality of anode lead tab terminals. Cathode lead tab terminal 13 connected to the cathode foil is not also limited to a case of one cathode lead tab terminal, but may be a case of a plurality of cathode lead tab terminals.

Anode lead tab terminal 12 and cathode lead tab terminal 13 penetrate into sealing member 3. By the penetration, capacitor element 1 is fixed to sealing member 3, and lead part 121 of anode lead tab terminal 12 and lead part 131 of cathode lead tab terminal 13 are drawn out of outer case 2. Further, each of lead parts 121 and 131 penetrates into base plate 50, and a portion including a tip of the lead part bends in an L-shape so as to follow lower surface 50a of base plate 50. By the portions following lower surface 50a of base plate 50 of lead parts 121 and 131, external terminals of the electrolytic capacitor are formed.

Outer case 2 is formed of a metal material such as aluminum. In opening 21 of outer case 2, narrowing part 22 having transverse narrowing process performed is formed for fixing sealing member 3 to outer case 2. Further, in the present exemplary embodiment, an end of the opening of outer case 2 has curling processing performed. A material of outer case 2 is not limited to a metal material, but outer case 2 may be formed of various materials including an electric insulation material.

Sealing member 3 is formed of an elastic material such as rubber. Narrowing part 22 compresses sealing member 3 from the periphery of sealing member 3 toward the inside. By compressing sealing member 3, sealing member 3 elastically deforms, and side peripheral surface 3a of sealing member 3 is in close contact with inner peripheral surface 2a of outer case 2. In this manner, opening 21 of outer case 2 is sealed by sealing member 3. Opening 21 of outer case 2 may be sealed by a resin material by filling opening 21 with the resin material, in place of fitting sealing member 3 in opening 21.

The electrolytic capacitor of the present exemplary embodiment can improve electric characteristics and reliability. Specifically, when the volume ratio R1 of the electrolytic solution to the solid electrolyte layer is 1.27 or more, a surface of the dielectric layer is easily covered with the electrolytic solution. Therefore, a damaged part of the dielectric layer is easy to be repaired, resulting in remarkable improvement of change rates of capacitance and ESR, and in large voltage resistance in the electrolytic capacitor. On the other hand, when the volume ratio R1 is less than 1.27, the solid electrolyte layer inhibits the electrolytic solution from reaching the surface of the dielectric layer. As reasons for causing the inhibition, it is considered that an amount of the conductive polymer becomes large with respect to an amount of the electrolytic solution, and therefore the surface of the dielectric layer is covered with a thick solid electrolyte layer or the conductive polymer absorbs the electrolytic solution. What should be noted here is as follows. It does not mean that if only the amount of the electrolytic solution is large, a good result comes out. It is important to find out approximately how much of the electrolytic solution is preferred in terms of the relationship with the amount of the conductive polymer.

When the volume ratio R1 is 2.54 or less, failure of liquid leakage after reflow does not occur in the electrolytic capacitor. On the other hand, when the volume ratio R1 is more than 2.54, such failure of liquid leakage is likely to occur.

When the volume ratio R2 of the void is 0.04 or more, an appropriate gap is formed in winding body 11. Therefore, even when expansion and contraction are repetitively caused to the conductive polymer and the electrolytic solution in a heat cycle, the appropriate space can absorb the expansion and contraction. In other words, a buffer action for expansion and contraction can be obtained. Accordingly, the conductive polymer is unlikely to peel from the dielectric layer. On the other hand, when the volume ratio R2 is less than 0.04, it is difficult to obtain the buffer action for expansion and contraction, and therefore the conductive polymer is likely to peel from the dielectric layer.

When the volume ratio R2 is 0.38 or less, in winding body 11 is secured volume occupied by necessary amounts of the electrolytic solution and the conductive polymer for obtaining desired electric characteristics. On the other hand, when the volume ratio R2 is more than 0.38, it becomes difficult to secure in winding body 11 volume occupied by necessary amounts of the electrolytic solution and the conductive polymer for obtaining desired electric characteristics.

[2] Method for Manufacturing Electrolytic Capacitor

Figure 2:
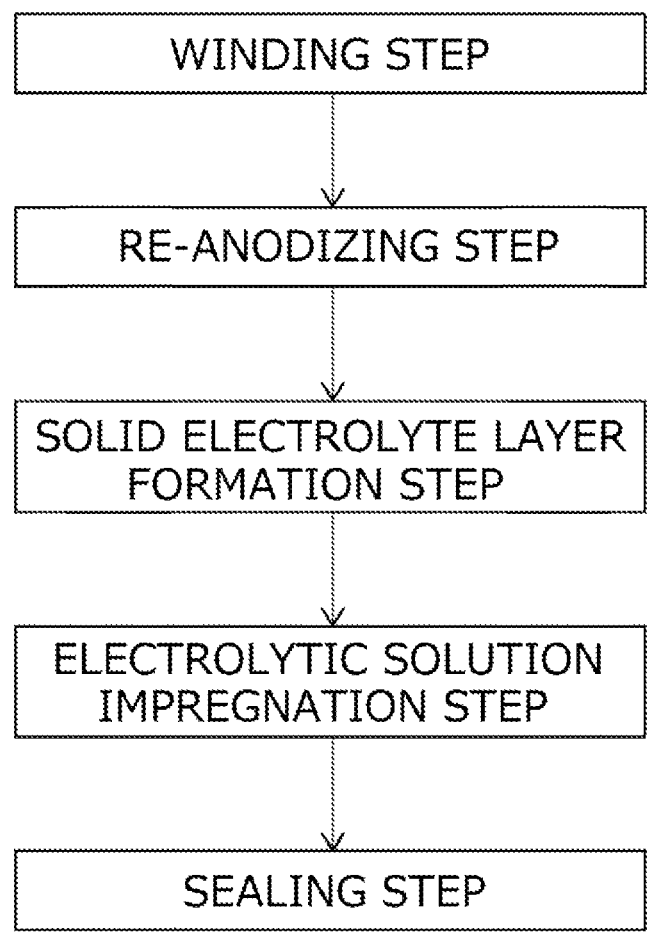
FIG. 2 is a flow chart showing a method for manufacturing an electrolytic capacitor according to the present exemplary embodiment.

FIG. 2 is a flow chart showing a method for manufacturing an electrolytic capacitor according to the present exemplary embodiment. In the manufacturing method of the present exemplary embodiment, a winding step, a re-anodizing step, a solid electrolyte layer formation step, an electrolytic solution impregnation step, and a sealing step are carried out in this order.

In the winding step, an anode foil, a cathode foil, and a separator are wound around a winding core to form winding body 11. Then, in order to prevent winding body 11 from losing shape, winding stop tape is wound around an outermost peripheral surface of winding body 11. Anode lead tab terminal 12 and cathode lead tab terminal 13 are attached to the anode foil and the cathode foil, respectively, before or in the middle of the winding. The anode foil is formed by cutting into a prescribed shape a metal foil on a surface of which a dielectric layer is formed. Accordingly, part of a metal constituting the anode foil is exposed on a cut surface.

In the re-anodizing step, a re-anodizing is performed on winding body 11. By the re-anodizing, a dielectric layer is formed on the exposed surface (cut surface) of the anode foil, and a damaged part of the dielectric layer is repaired.

In the solid electrolyte layer formation step is first prepared a dispersion liquid in which particles of a conductive polymer are dispersed, or a solution in which a conductive polymer is dissolved. As the conductive polymer, for example, polypyrrole, polythiophene, polyfuran, or a derivative of these polymers can be used. Among these polymers, a derivative of polythiophene, i.e. polyethylenedioxythiophene has a high self-repairing function in addition to high conductivity, and therefore is particularly preferred as the conductive polymer. As the conductive polymer may be used one conductive polymer selected from various conductive polymers not limited to these conductive polymers, or a plurality of conductive polymers in combination. The conductive polymer preferably contains a dopant. As the dopant, for example, p-toluenesulfonic acid and polystyrene sulfonic acid can be used.

Then, winding body 11 is impregnated with the prepared dispersion liquid or the solution to infiltrate the dispersion liquid or the solution into a gap present in winding body 11 through the separator. Then, drying is conducted to dry the dispersion liquid or the solution impregnated into winding body 11. By the processes described above, a solid electrolyte layer is formed in winding body 11. In the solid electrolyte layer formation step, the impregnation and drying of the dispersion liquid or solution may be repeated a plurality of times. The solid electrolyte layer formed by using the dispersion liquid includes an aggregate in which the particles of the conductive polymer in the dispersion liquid are aggregated.

In the electrolytic solution impregnation step is first prepared an electrolytic solution to be impregnated into winding body 11. The electrolytic solution to be impregnated into winding body 11 is not limited to a solution containing an electrolyte but also includes a non-aqueous solvent containing no electrolyte. It is preferred, however, that the non-aqueous solvent used as the electrolytic solution be one that can exhibit a repairing action for repairing a damaged part of the dielectric layer, and that does not deteriorate a conductive polymer that has contacted with the non-aqueous solvent. Examples of such a non-aqueous solvent include γ-butyrolactone, sulfolane, ethylene glycol, and propylene carbonate. As the electrolytic solution may be used not only these non-aqueous solvents but also one non-aqueous solvent selected from various non-aqueous solvents that can exhibit a repairing action, and a plurality of non-aqueous solvents in combination.

Next, the prepared electrolytic solution is injected into outer case 2. In the injection, a prescribed amount of the electrolytic solution is injected into outer case 2. Subsequently, winding body 11 is inserted into outer case 2 to impregnate the electrolytic solution into winding body 11. Thus, the electrolytic solution is infiltrated into a gap present in winding body 11 through the separator, resulting in that the gap present in winding body 11 is filled with the electrolytic solution and the electrolytic solution is brought into contact with the dielectric layer and the solid electrolyte layer. Thus, capacitor element 1 is completed.

The impregnation of the electrolytic solution into winding body 11 may be conducted in the following manner. That is, a prescribed amount of the electrolytic solution may be injected into winding body 11 to impregnate the electrolytic solution into winding body 11 before the insertion of winding body 11 into outer case 2.

In the solid electrolyte layer formation step and the electrolytic solution impregnation step, the formation of the solid electrolyte layer and the impregnation of the electrolytic solution are preferably conducted so that a volume ratio R1 of the electrolytic solution impregnated into winding body 11 to the solid electrolyte layer formed in winding body 11 ranges from 1.27 to 2.54 both inclusive. Particularly preferably, the volume ratio R1 ranges from 2.12 to 2.54 both inclusive. Further, in the electrolytic solution impregnation step, the impregnation of the electrolytic solution into winding body 11 is preferably conducted so that in winding body 11 is formed a void in which neither the solid electrolyte layer nor the electrolytic solution is present. Here, the impregnation of the electrolytic solution into winding body 11 is particularly preferably conducted so that a volume ratio R2 of the void to a maximum volume of the electrolytic solution that can be impregnated into winding body 11 before the solid electrolyte layer is formed ranges from 0.04 to 0.38 both inclusive.

In the sealing step, opening 21 of outer case 2 is sealed by sealing member 3 with capacitor element 1 housed in outer case 2. Thus, capacitor main body 10 is completed. Subsequently, capacitor main body 10 is mounted on base plate 50 to complete an electrolytic capacitor shown in FIG. 1. In the sealing step, opening 21 of outer case 2 may be sealed by a resin material by filling opening 21 with the resin material.

The configurations of the present disclosure are not limited to the exemplary embodiments described above, but can be modified variously in a technical scope described in the claims. For example, the conductive polymer contained in the solid electrolyte layer may be formed by a polymerization method.

Examples

The inventors of the present disclosure prepared, as examples of the exemplary embodiments described above, electrolytic capacitors (rated voltage 100 V, rated capacitance 15 μF) under the following conditions. That is, aluminum foils are used as the anode foil and the cathode foil, and these foils are wound together with a separator. With polyethylenedioxythiophene used as the conductive polymer, a dispersion liquid in which particles of polyethylenedioxythiophene are dispersed is impregnated between the anode foil and the cathode foil, and then the dispersion liquid is dried, to form a solid electrolyte layer. As the electrolytic solution, an electrolytic solution which contains γ-butyrolactone, sulfolane, and dicarboxylic acid was used. Then, 4 electrolytic capacitors (Examples 1 to 4) were prepared, in which the volume ratio R1 of the electrolytic solution and the volume ratio R2 of the void which were described above were set to the following values: (R1, R2)=(1.27, 0.38), (1.69, 0.27), (2.12, 0.15), (2.54, 0.04).

Further, the inventors of the present disclosure prepared, for comparison with Examples 1 to 4, 3 electrolytic capacitors (Comparative Examples 1 to 3) in which the volume ratio R1 of the electrolytic solution and the volume ratio R2 of the void which were described above were set to the following values: (R1, R2)=(0, 0.73), (0.85, 0.50), (2.96, 0). The other conditions are the same as in Examples 1 to 4.

The inventors of the present disclosure prepared 20 samples for each of the electrolytic capacitors with respect to Examples 1 to 4 and Comparative Examples 1 to 3. Then, as to the samples of these electrolytic capacitors, change rates of capacitance and equivalent series resistance (ESR) as well as voltage resistance were measured as electric characteristics. In addition, presence or absence of failure of liquid leakage after reflow was confirmed for the samples of the electrolytic capacitors. Table 1 shows the results of the measurement and confirmation.

As measurement conditions of the electrolytic capacitors, a measuring frequency was set to 120 Hz for the capacitance and a measuring frequency was set to 100 kHz for the ESR. The change rates for the capacitance and the ESR were obtained according to the following formulae (3) and (4), respectively, by measuring initial capacitance C (0) and ESR (0) and capacitance C (3000) and ESR (3000) after the lapse of 3000 hours from the start of the measurement in the environment of 105° C. The measurement of the voltage resistance was carried out while a voltage applied to an electrolytic capacitor is increased at a rate of 1 V/s, and a voltage was measured as the voltage resistance when a current of 500 mA flowed in the electrolytic capacitor.

$$(\text{Change rate of capacitance}) = \frac{C(3000) - C(0)}{C(0)} \times 100(\%) \quad (3)$$

$$(\text{Change rate of } ERS) = \frac{ERS(3000) - ERS(0)}{ERS(0)} \quad (4)$$

From the results shown in Table 1, it was understood that in Examples 1 to 4, the change rates of the capacitance and the ESR were remarkably small, while the voltage resistance was remarkably large, compared to Comparative Examples 1 and 2. By the results, it was confirmed that a lower limit value is 1.27 in a preferable range of the volume ratio R1 of the electrolytic solution described above. It was also confirmed that an upper limit value is 0.38 in a preferable range of the volume ratio R2 of the void described above.

Further, from the results shown in Table 1, it was understood that the failure of liquid leakage after reflow occurs in Comparative Example 3, while the failure does not occur in Examples 1 to 4. By the results, it was confirmed that an upper limit value is 2.54 in a preferable range of the volume ratio R1 of the electrolytic solution described above. It was also confirmed that a lower limit value is 0.04 in a preferable range of the volume ratio R2 of the void described above.

What is claimed is:

1. An electrolytic capacitor including a capacitor element, the capacitor element comprising:
   an anode member on which a dielectric layer is formed;
   a cathode member;
   a winding body wound around by the anode member and the cathode member;

TABLE 1

|  | Volume ratio R1 of electrolytic solution | Volume ratio R2 of void | Change rate of capacitance (%) | Change rate of ESR | Voltage resistance (V) | Failure of liquid leakage |
|---|---|---|---|---|---|---|
| Comparative Example 1 | 0 | 0.73 | −9.59 | 1.32 | 150.8 | None |
| Comparative Example 2 | 0.85 | 0.50 | −6.82 | 1.25 | 172.9 | None |
| Example 1 | 1.27 | 0.38 | −4.63 | 1.16 | 184.7 | None |
| Example 2 | 1.69 | 0.27 | −4.13 | 1.17 | 188.3 | None |
| Example 3 | 2.12 | 0.15 | −3.87 | 1.19 | 197.6 | None |
| Example 4 | 2.54 | 0.04 | −4.28 | 1.17 | 200.9 | None |
| Comparative Example 3 | 2.96 | 0 | −4.14 | 1.18 | 199.9 | Exist | a solid electrolyte layer containing a conductive polymer and formed in the winding body; and an electrolytic solution impregnated into the winding body in which the solid electrolyte layer is formed, wherein a volume ratio of the electrolytic solution impregnated into the winding body to the solid electrolyte layer formed in the winding body ranges from 1.27 to 2.54 both inclusive.

2. The electrolytic capacitor according to claim 1, wherein:

the capacitor element includes a void in which neither the solid electrolyte layer nor the electrolytic solution is present, and a volume ratio of the void to a maximum volume of the electrolytic solution that can be impregnated into the winding body before the solid electrolyte layer is formed ranges from 0.04 to 0.38 both inclusive.

3. The electrolytic capacitor according to claim 1, wherein the solid electrolyte layer is formed by impregnating the winding body with a dispersion liquid in which particles of the conductive polymer are dispersed or a solution in which the conductive polymer is dissolved, and then drying the dispersion liquid or the solution impregnated into the winding body.

4. The electrolytic capacitor according to claim 1, wherein the solid electrolyte layer includes an aggregate of particles of the conductive polymer.

\* \* \* \* \*